(No Model.)
A. J. TOWER.
HORSEMAN'S COAT.
No. 313,130. Patented Mar. 3, 1885.
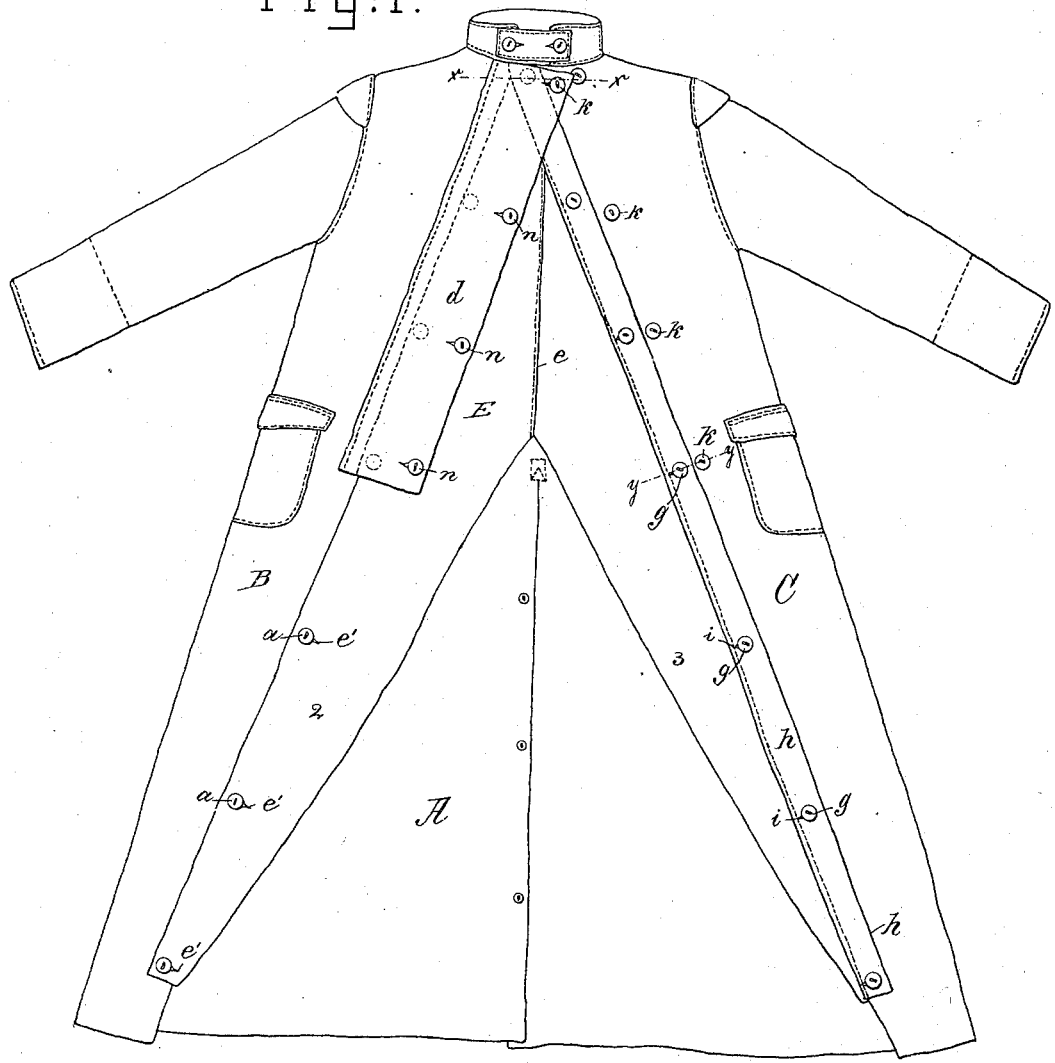
Fig:1.
Fig:2. Fig:3.
Witnesses. 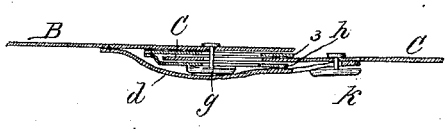
Inventor. 
Abner J. Tower.
by Crosby & Gregory
Att'ys.

UNITED STATES PATENT OFFICE.

ABNER J. TOWER, OF BOSTON, MASSACHUSETTS.

HORSEMAN'S COAT.

SPECIFICATION forming part of Letters Patent No. 313,130, dated March 3, 1885.

Application filed July 28, 1884. (No model.)

*To all whom it may concern:*

Be it known that I, ABNER J. TOWER, of Boston, county of Suffolk, State of Massachusetts, have invented an Improvement in Horsemen's Coats, of which the following description, in connection with the accompanying drawings, is a specification, like letters on the drawings representing like parts.

This invention has for its object to provide a horseman's water-proof coat with a detachable crotch-shaped extension adapted to be fastened to the front portions of said coat in such manner that when the horseman is in the saddle the coat will have sufficient fullness to easily and readily pass over the pommel and cantle of the saddle, so that both wearer and saddle will be thoroughly protected from the weather. Furthermore, when it is desired to wear the coat out of the saddle, or when walking, the wearer may readily entirely remove the extension-piece from the coat, leaving the latter of ordinary size and adapted to be buttoned about the wearer, as usual.

The nature of my present invention is set forth in the following description, and is particularly pointed out in the claims.

Figure 1 shows in front elevation a horseman's coat embodying my invention; Fig. 2, a sectional detail on line *x x*, Fig. 1; and Fig. 3, a similar detail on line *y y*, Fig. 1.

The coat A is provided along the edges of the front portions, B C, with the usual buttons, *a*, and storm-flap *d*, the latter extending from the collar to a point a little below the waist-line. The crotch-shaped extension-piece E is preferably composed of two triangular pieces joined at their shortest sides or edges, as at *e*, it having a series of button-holes, *e'*, along the longest edge of the portion 2 of the extension, while the longest edge of the other portion, 3, of said extension has buttons *g*, and a button-flap, *h*, with button-holes *i*, the whole being provided to enable the extension to be attached to the edges of the front portions, B C, of the coat from the collar to or near the bottom of the coat, as clearly indicated in the drawings. The button-holes *e'* of the part 2 of the extension engage the buttons *a* of the front portion, B, while the buttons *g* of the part 3 pass through the button-holes of the front portion, C, and through those *i* of the button-flap *h*, as shown in Fig. 3.

As shown in Fig. 3, the top button, *a*, of the portion B just below the collar passes respectively through the apex of the extension E, the top button-hole of the portion C, and the like button-hole of the button-flap *h*, while the storm-flap covers the parts, and is fastened to the top one of the series of buttons *k*.

The storm-flap *d* is removably fastened to the extension with buttons *n*. When the extension is thus detachably retained in place, it provides a fullness in the coat from the collar to the waist-line sufficient to enable it to be passed over the pommel and cantle of the saddle when the wearer is seated thereon, so that both horseman and saddle are fully protected from the weather. The extension is of a gradually-increasing width from the collar of the coat to the waist-line thereof, where it is bifurcated, and the bifurcations taper or decrease in width toward the bottom of said coat.

The extension E may be readily detached from the coat, and when the wearer is out of the saddle the coat may be buttoned about his person, as in the case of an ordinary storm-coat.

If desired, the part 2 of the extension may be provided below that portion covered by the storm-flap *d* of the coat with a flap like that *h* of the part 3, so that the possibility of rain or snow beating in between the coat and the part 2 of the extension will be obviated.

I claim—

1. A horseman's coat provided with the usual buttons and button-holes along the edges of the front portions, combined with an extension-piece adapted to be detachably secured to said front portions, the said extension-piece increasing in width from its apex, where it is attached to the coat at its collar, to a point about in line with the waist-line of said coat, and then divided, with the bifurcations tapering from the crotch downward, and provided with the buttons and button-holes on opposite edges, substantially as set forth.

2. A horseman's coat provided with an extension-piece detachably secured to the edges of the front portions of said coat, the said extension of an increasing width from the collar to the waist-line of the coat, and bifurcated at the waist-line, with the bifurcations or ends tapering from the crotch, substantially as described.

In testimony whereof I have signed my name to this specification in the presence of two subscribing witnesses.

ABNER J. TOWER.

Witnesses:
G. W. GREGORY,
W. H. SIGSTON.